United States Patent Office 2,724,795
Patented Nov. 22, 1955

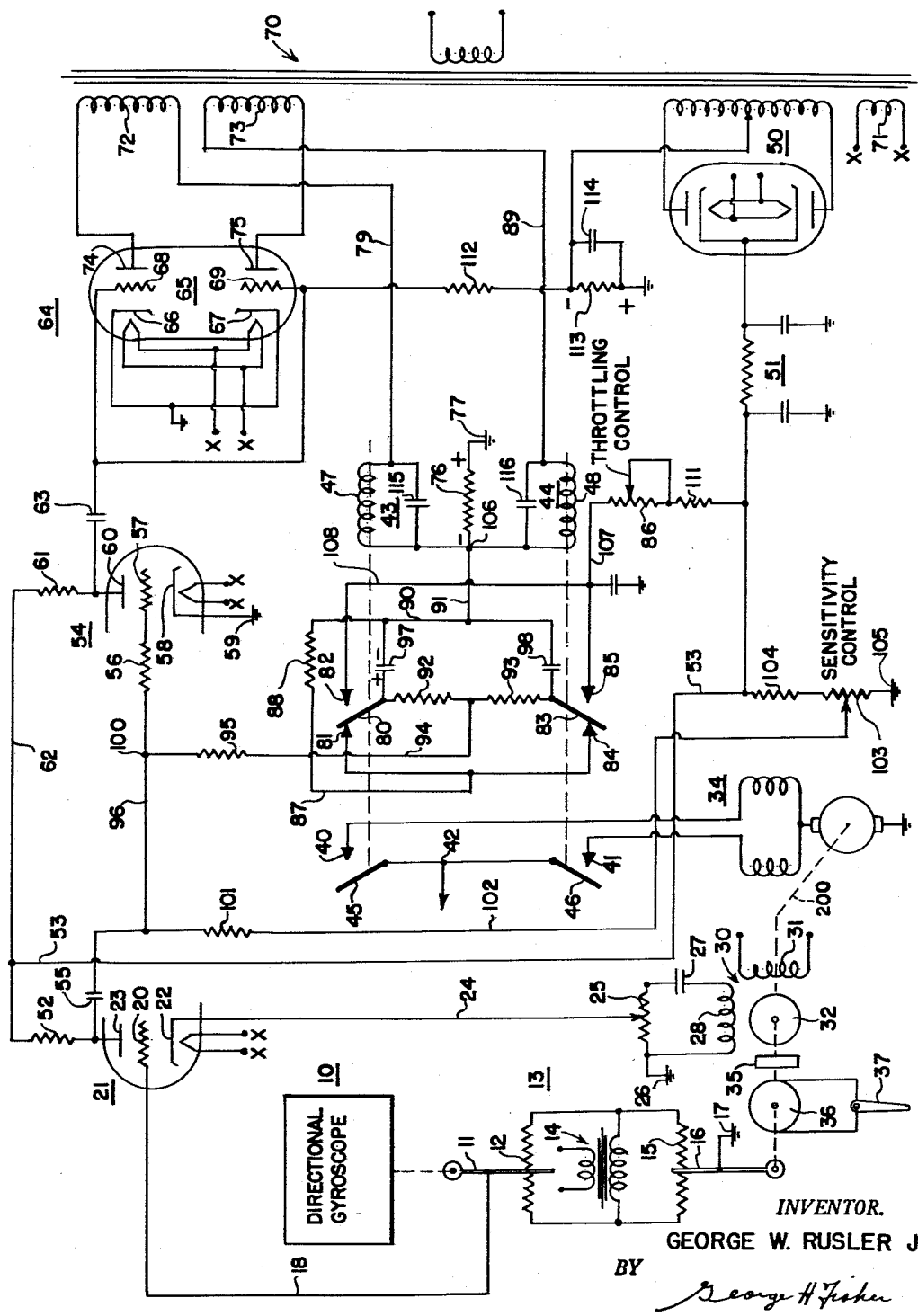

2,724,795

ELECTRONIC MOTOR CONTROL APPARATUS

George W. Rusler, Jr., Minneapolis, Minn., assignor to Minneapolis-Honeywell Regulator Company, Minneapolis, Minn., a corporation of Delaware Application March 15, 1952, Serial No. 276,763

14 Claims. (Cl. 318—29)

This invention relates to an electronic motor control apparatus and more particularly to an apparatus making use of an amplifier which is operative through relay means to cause the motor to be energized intermittently at a rate sufficiently high to minimize pulsations in the speed of the motor and also making use of a velocity signal generator to provide a speed regulation and anti-hunt feature to stabilize the operation of the apparatus.

Prior art electronic motor controls for the most part included an amplifier sensitive to an error signal which amplifier energized a relay continuously which in turn energized the motor continuously. It is the natural characteristic of a relay to furnish a constant level of energization to the motor. In a system such as this, it is necessary to deenergize the motor a substantial period of time before the error signal was reduced to zero. After the motor is deenergized, due to its angular momentum it coasts to a stop at a point where the error signal into the amplifier is actually zero or is not of a sufficient magnitude to cause energization of the relay. A system of this type therefore inherently had a relatively wide dead band since energization of the motor stops before the error signal is zero and conversely is not energized initially until a considerable error signal has developed, that is, a relatively large error signal is necessary before the relay will be energized to cause the motor to operate and reduce this error signal. A wide dead band is necessary for this system since it is possible with too narrow a dead band for a hunting condition to exist when the motor, because of its angular momentum, has a tendency to overshoot the position at which the error signal is reduced to zero. The addition of a velocity signal generator to this system reduces the hunting effect.

In an attempt to arrive at a motor control system having substantially proportional speed control, the amplifier of the above mentioned system was replaced by an amplifier of the type shown in the Willis H. Gille Patent 2,425,734, issued August 19, 1947. This type of an amplifier inherently provides for intermittent energization of the relay of the above mentioned system to cause intermittent energization of the motor and if the speed of the motor is considered as the distance the motor rotates during a period of time, the speed of the motor is substantially proportional to the error signal. However for some applications this type of energization of the motor was objectionable and it was found that very slight if any improvement resulted over the above mentioned system having a continuously energized relay and a velocity generator.

It is therefore an object of this invention to provide a motor control apparatus which utilizes a relay means to energize a motor in a series of discrete steps, the frequency of these steps being such that the motor rotation is substantially free of pulsations, and which apparatus utilizes a velocity signal generator to stabilize motor operation.

It is a further object of the present invention to provide a motor control apparatus which utilizes a velocity signal generator to provide stabilization and includes an amplifier and relay means operable to energize the motor in a series of discrete steps, the time duration of energization of the motor being relatively long and the time period of deenergization being relatively short so that there is substantially true proportional control of the motor speed without appreciable pulsations in the speed of the motor. Other objects and advantages of my invention will become apparent from a consideration of the appended specification, claims and the single figure which is a combined diagrammatic representation and schematic showing of a motor control apparatus embodying the principles of my invention.

Referring now to the figure, there is shown a system for controlling the movements of an aircraft in accordance with the deflection of a directional gyroscope 10 from a normal position. The gyroscope 10 is constructed so as to rotate a wiper 11 of a potentiometer 12 whenever the aircraft on which the gyroscope is mounted changes its direction.

The potentiometer 12 forms a portion of an electrical bridge network 13 comprising an alternating current transformer 14, the potentiometer 12, and a second potentiometer 15. The potentiometer 15 has a cooperating wiper 16 which is connected to ground potential at the connection numbered 17.

The output of the electrical bridge network 13 is connected by means of a conductor 18 to the input of an electronic amplifier, the first stage of which comprises an electron discharge device 21, having a control grid 20, a cathode 22, and an anode 23. The cathode 22 is connected by means of a conductor 24 to the adjustable tap of a resistor 25, which resistor has one end thereof connected to ground potential at the connection numbered 26. The resistor 25 is connected in a series circuit consisting of a capacitor 27 and a secondary winding 28 of a velocity signal generator 30.

The velocity signal generator 30 is a device employing a primary winding 31 and a secondary winding 28 in non-inductive relationship with the primary. Upon rotation of a rotor 32 of the generator 30, a voltage is induced in the secondary winding 28, the voltage being of the same frequency as that of the primary 31 and of a phase and magnitude depending upon the direction and speed of rotation of the rotor 32.

The rotor 32 of the velocity signal generator 30 is connected by means of a shaft, represented by the broken line 200, to a driving means, namely a servomotor 34. Rotation of the servomotor 34 also causes, through a speed reduction device 35, rotation of a drum 36 which controls the movement of a control surface 37 of the aircraft. The control surface 37 is effective to alter the direction of travel of the aircraft and may be a rudder surface. The servomotor 34 is also operable to cause movement, through the speed reducing device 35, of the wiper 16 which cooperates with the potentiometer 15 of the electrical bridge network 13.

The servomotor 34 is of the direct current type and is conditioned to rotate in one direction or the other depending upon which of the contacts 40 and 41 are connected to terminal 42, which terminal is connected to a direct current source. As can be seen, the direction of rotation of the servomotor 34 is dependent upon which of the relays 43 or 44 are energized to thereby move their associated switch blades 45 and 46 into engagement with the contacts 40 and 41 respectively. The switch blades 45 and 46 are biased, by means not shown, to normally assume the position shown in the single figure.

The electronic amplifier portion of the single figure includes a conventional full wave rectifier 50 having a filter network 51 from which a positive voltage is supplied to desired portions of the electronic amplifier. The input of this amplifier, as before mentioned, consists of the electron discharge device 21 whose anode 23 is connected to the before mentioned positive voltage by means of a resistor 52 and a conductor 53. The output signal of the input stage is coupled to a control electron discharge device 54 by means of a capacitor 55 which is connected through a resistor 56 to the control grid 57 of the electron discharge device 54. The cathode 58 of the electron discharge device 54 is directly connected to ground potential at a connection 59 while the anode 60 is connected through resistor 61 and conductor 62 to the conductor 53 and thereby to the before mentioned positive voltage source. The output of the electron discharge device 54 is coupled by means of a capacitor 63 to a phase discriminating stage 64.

The phase sensitive discriminating stage 64 consists of an electron discharge device 65 which is of the dual triode type. The cathodes 66 and 67 of the dual triode are connected to ground potential while the control electrodes 68 and 69 are connected to the before mentioned capacitor 63. The anode 74 of the upper triode is connected to the upper terminal of the secondary 72 while the anode 75 of the lower triode is connected to the lower terminal of the secondary 73. The lower terminal of the secondary 72 is connected by means of a conductor 79 to the winding 47 of the relay 43 and then by means of a resistor 76 to ground potential at a connection 77. The upper terminal of the secondary 73 is connected by means of a conductor 89 to the winding 48 of the relay 44 and then to the resistor 76 which is connected to ground potential at the connection 77. The phase sensitive discriminating stage 64 is normally provided with a negative bias by means of a circuit including a resistor 112 connected to a parallel resistor 113 and capacitor 114 combination connected in circuit with the full wave rectifier 50.

The phase sensitive discriminating stage 64 is capable of selectively energizing one of the relays 43 and 44 in accordance with the phase of the input signal to the dual triode 65. This is true since the primary of the transformer 14 and the primary of the transformer 70 are connected to a common source of alternating current and the amplified unbalance voltage of the bridge is applied to both grids 68 and 69 in like phase while voltages of opposite phase are applied to the anodes 74 and 75. Thus, the voltage applied to the grids is either in phase with one or the other of the two anode voltages. The triode whose grid voltage is in phase with its anode voltage is conductive while the other triode is biased further negatively during the conductive half cycles by the signal voltage and remains non-conductive. Thus, an unbalance of the bridge 13 in a particular sense causes the one of the relays 43 and 44 to be energized which is effective to cause the motor 34 to move the control surface 37 in a direction to restore the aircraft to the desired direction of travel.

The relay 43 is operative to control the before mentioned switch blade 45 and a switch blade 80. The switch blade 80 is normally biased, by means not shown, to make connection with a contact 81 and when the relay 43 is energized this connection is broken and a connection is made from the switch blade 80 to a contact 82. The relay 44 controls the before mentioned switch blade 46 and a switch blade 83. The switch blade 83 is normally biased, by means not shown, to make connection to a contact 84 and when the relay 44 is energized the switch blade 83 moves to break this connection and to complete a connection from switch blade 83 to a contact 85.

The contacts 82 and 85 associated with the respective relays 43 and 44 are connected to a throttling control network comprising a potentiometer 86 and a resistor 111, which network is connected to the positive voltage source provided by the full wave rectifier 50. The contacts 81 and 84 associated with the respective relays 43 and 44 are connected by means of a conductor 87 to a resistor 88 and by means of conductors 90 and 91 to the resistor 76 which is connected to ground potential at connection 77. The switch blades 80 and 83 associated with the respective relays 43 and 44 are connected through isolating resistors 92 and 93 respectively to conductor 94 and then to a resistor 95 which is connected to a terminal 100, which terminal makes connection to the conductor 96 located in the input circuit of the control electron discharge device 54. Timing capacitors 97 and 98 are connected from the switch blades 80 and 83 respectively to the conductor 90.

In order to clearly understand the manner in which the device of the figure operates, it is desirable to consider in detail the characteristics of the amplifier circuit and in particular the characteristics of the control stage which includes the electron discharge device 54. The input signal to the control stage will be considered to be the potential difference between the above mentioned terminal 100 and ground. This control stage, which includes the electron discharge device 54 and the resistor 56, is normally operated in a region of positive current saturation. In other words, a positive signal voltage applied to the terminal 100 of the control stage will not affect the anode current through the resistor 61 of the control stage. However, a negative input voltage results in a decrease in current through the resistor 61.

The theory of operation of this control stage becomes more apparent when it is understood that any voltage applied to terminal 100 is distributed between the resistor 56 and the control electrode-to-cathode resistance of the electron discharge device 54. Thus, when the applied voltage is negative, no current will flow between the cathode and the control electrode and the negative voltage is impressed upon the grid. When the voltage applied to the terminal 100 is positive, a current flows between the cathode and control electrode and since the resistance from control electrode to cathode is very low in comparison to the resistor 56, the majority of the applied voltage is dropped across the resistor 56 and only a small fraction of the applied voltage is actually impressed on the control electrode. Thus, a negative voltage applied to terminal 100 results in a sharp drop in current through the electron discharge device 54 while a positive voltage applied to terminal 100 has no appreciable effect on the current passed by electron discharge device 54.

Consider now the sensitivity control circuit, which circuit can be traced from terminal 100 through conductor 96, resistor 101, and conductor 102 to the sensitivity control potentiometer 103, which potentiometer has its upper terminal connected by means of a resistor 104 to the positive voltage produced by rectifier 50 and which has its lower terminal connected to ground potential at a connection 105. Since the cathode 58 of the electron discharge device 54 is connected to ground potential by means of a connection 59, it can be seen that the sensitivity control potentiometer 103 determines the steady state positive voltage which is to be applied to terminal 100. Therefore, the sensitivity potentiometer 103 determines the sensitivity of the system by regulating the magnitude of negative signal which must be present at the terminal 100 in order to overcome this steady state positive bias and thereby effect a reduction in the current passed by the electron discharge device 54.

A second circuit can be traced from the terminal 100 to the cathode 58 of the electron discharge device 54, which circuit can be traced from terminal 100 through resistor 95, conductor 94, isolating resistor 93, switch blade 83 and contact 84 in parallel with isolating resistor 92, switch blade 80 and contact 81, to the conductor 87, resistor 88, conductors 90 and 91, resistor 76, ground connection terminal 77, and ground connection terminal 59 to the cathode 58. As before mentioned, resistor 76 is connected in the plate to cathode circuit of each of the sections of the dual triode 65 and is connected in a manner to cause the ground terminal connection of the resistor 76 to assume a positive potential with respect to the other terminal of the resistor, numbered 106. It can therefore be seen that the voltage present across the resistor 76 due to current flowing through the dual triode 65 is effective to apply a negative voltage to the terminal 100 of the control stage. This is effectively a regenerative feedback circuit and tends to increase the sensitivity of the control stage as the input signal to the terminal 100 approaches the threshold value, that is, the value at which the input signal to terminal 100 sufficiently overcomes the steady state positive bias applied to the terminal 100 by means of the sensitivity potentiometer 103 to thereby pull in either relay 43 or 44.

As before mentioned, the primary of the transformer 14 is connected to a common alternating current source with the primary of the transformer 70 and the phasing of these connections is such that phase sensitive discriminator 64 is able to detect the sense of movement of the wiper 11 of the potentiometer 12 as caused by movement of the aircraft and is effective to selectively energize the particular one of the relays 43 and 44 which is effective to control the servomotor 34 to return the aircraft to the desired position by means of the control surface 37. Assuming now that the threshold voltage has been reached and one of the relays, say relay 43, has been energized, the switch blade 45 will move to make connection with the contact 40 and the switch blade 80 will break its connection with contact 81 and move into engagement with contact 82. A circuit can now be traced from the positive voltage source furnished by rectifier 50 through the resistor 111, the throttling potentiometer 86, conductor 107, conductor 108, contact 82, switch blade 80, timing capacitor 97, conductor 90, conductor 91, and resistor 76 to ground terminal connection 77. With the switch blade 80 in this position, the timing capacitor 97 assumes a charge which is effective to place a further positive potential upon the terminal 100. This can be shown by tracing a circuit from terminal 100 which includes the resistor 95, conductor 94, isolation resistor 92, capacitor 97, conductor 90, conductor 91, and resistor 76 to the ground terminal connection 77. Therefore, it can be seen that depending upon the time constant of the circuit which includes the throttling potentiometer 86, resistor 111, and the timing capacitor 97, the positive voltage applied to the terminal 100 of the control stage will gradually increase to thereby gradually render the control stage less sensitive since, as the positive voltage at the terminal 100 increases, a greater negative input signal is required to overcome this positive bias. This last traced circuit can therefore be called a degenerative feedback circuit. After a given interval of time, the positive voltage on the terminal 100 has increased to a point whereby a signal is no longer passed through the capacitor 63 to the phase sensitive discriminator 64 and therefore the relay 43 will be deenergized. Deenergization of relay 43 returns the switch blade 80 to the contact 81 and thereby connects the timing capacitor in a relatively short time constant discharge circuit. This circuit can be traced from the positive terminal of the capacitor 97 to the switch blade 80, contact 81, conductor 87, and resistor 88 to the negative terminal of the capacitor 97. Therefore, in a relatively short time period the charge of the capacitor 97 will be dissipated by current flowing through the discharge resistor 88 and the positive potential of the terminal 100 will reduce to increase the sensitivity of the control stage. The control stage is now again sensitive to the normal threshold input signal as determined by the sensitivity control potentiometer 103 and the above described cycle is repeated.

To clearly understand the manner in which my invention provides proportional control of the servomotor 34 with no appreciable pulsation in the speed of the motor it is necessary to consider the relationship between the time of energization and deenergization of the selectively energized relay 43 or 44 and the magnitude of the input signal applied to terminal 100 from the electron discharge device 21. As before mentioned, the timing capacitor 97 or 98 is effective to reduce the sensitivity of the system when one of the relays 43 or 44 is energized. The energization of either of these relays connects its associated timing capacitor in the above traced circuit which includes the positive voltage source of rectifier 50. The charge on the selected timing capacitor increases and likewise the sensitivity of the system decreases with time along an exponential curve as determined by the time constant of the timing circuit. Therefore, for a given input signal to terminal 100 the selectively energized relay will remain energized for a length of time necessary for the charge on the selected timing capacitor to increase to a value to overcome this signal. Since the time constant of this circuit is relatively large, the time period necessary for the capacitor to charge to a first voltage will be appreciably larger than the time period necessary for the capacitor to charge to a second voltage lower than the first voltage. The length of this time period determines the speed at which the servomotor 34 is rotating at the end of the period and both the time period and speed are proportional to the input signal.

It is of course recognized that the servomotor 34 is not brought up to full speed until the magnitude of the input signal to terminal 100 is of a large enough magnitude so that the charge on the timing capacitor is incapable of overcoming the input signal. And for this condition, as the aircraft moves toward its desired direction of travel, the input signal to terminal 100 will decrease until the servomotor 34 is again energized intermittently as pointed out above.

The discharge circuit for the selected timing capacitor, comprising the resistor 88 shunting the capacitor, has a relatively short time constant and therefore the sensitivity of the system is restored in a relatively short time period. For all practical purposes the discharge time period, and therefore the time of deenergization of the selectively energized relay, is constant for all values of input signal. It is recognized that there is a slight difference in this time period for different input signals, due to the different voltages necessary upon the timing capacitor to render the system insensitive to input signals of different magnitudes, however, due to the small time constant of this circuit this difference can be ignored.

The discharging of the selected timing capacitor renders the system again sensitive, but now the direction of aircraft travel has been partially restored to the desired direction and the input signal to terminal 100 is reduced by movement of wiper 11 toward its desired position, by movement of wiper 16 in the follow up portion of the system, and by the signal present across the resistor 25 associated with the velocity signal generator 30. Therefore, the time period of energization of the selectively energized relay for the next cycle of energization will be shorter than the previous time period and the speed of the servomotor 34 will decrease.

While the particular values of the various components are not critical and the invention is not to be limited to any particular values, the following are the values of the components in one embodiment of the invention.

| Reference number | Values of components | |
|---|---|---|
| 52 | megohms | .47 |
| 61 | do | .47 |
| 101 | do | 2 |
| 95 | do | 1 |
| 56 | do | .47 |
| 104 | do | .47 |
| 103 | do | .08 |
| 92 | do | 1 |
| 93 | do | 1 |
| 88 | ohms | 47,000 |
| 76 | do | 82 |

| | | |
|---|---|---|
| 86 | megohms | 5 |
| 111 | do | 1 |
| 112 | do | .47 |
| 113 | ohms | 3,000 |
| 25 | do | 1,000 |
| 55 | microfarad | .01 |
| 63 | do | .01 |
| 115 | do | .25 |
| 116 | do | .25 |
| 114 | do | 10 |
| 27 | do | .15 |
| 97 | do | .1 |
| 98 | do | .1 |

It was found desirable in this embodiment to design the full wave rectifier 50 so that it produced at the output of the filter network 51 a direct current voltage of a magnitude of 250 volts. The electron discharge devices 21 and 54 were composed of the twin triode 2C52 while the phase sensitive discriminator 64 was a 2C50.

Operation

In considering the operation of the single figure, it will be first noted that the apparatus as shown is in the deenergized position, that is, there is no need for adjustment of the control surface 37.

Assume now that a deviation in the direction of travel of aircraft has caused the directional gyroscope 10 to move the wiper 11 of the potentiometer 12 toward the right hand end of the potentiometer 12. The output of the bridge network 13 therefore will be of a magnitude depending upon the distance of movement of the wiper 11 and of a first phase. It is readily recognized that if wiper 11 had moved toward the left hand end of the potentiometer 12, the output voltage of the bridge 13 would be of the opposite phase. This output signal is fed to the control electrode 20 of the first stage of the amplifier. It is of course recognized that at this time neither of the relays 43 or 44 is energized and therefore the servomotor 34 is not rotating. Therefore, the velocity signal generator 30 is also stationary and no voltage is developed across the resistor 25 which lies in the cathode circuit of the electronic discharge device 21. Also, the follow up system which consists of the wiper 16 and the potentiometer 15 has not been adjusted to reduce the output voltage of the bridge 13.

The before mentioned output signal of the bridge 13 is amplified in a conventional manner by the electron discharge device 21 and is applied to the terminal 100 of the control stage. As explained in detail before, if this voltage applied to the terminal 100 is of a proper magnitude the electron discharge device 54 will amplify this voltage and apply it to the control electrodes 68 and 69 of the dual triode 65. This phase sensitive discriminator 64 will now selectively energize the one of the relays 43 and 44 which is effective to cause the servomotor 34 to be energized to rotate in a direction to cause the control surface 37 to restore the aircraft to the original or desired direction of travel. As stated above, the sensitivity of the control stage is increased by passage of a signal from the control stage to the phase sensitive discriminator since the resistor 76 which lies in the plate to cathode circuit of the dual triode 65 of the discriminator also lies in the control electrode to cathode circuit of the control stage in a manner to increase the sensitivity of the control stage.

Assuming that relay 44 is energized, the switch blade 46 will move to make contact with the contact 41 and the servomotor will be energized to rotate in a direction to cause the wiper 16 to move toward the right end of the potentiometer 15 of the bridge 13. The magnitude of this movement is dependent upon the initial movement of the wiper 11 of the potentiometer 12 as caused by the directional gyroscope 10. Also, rotation of the velocity signal generator 30 causes a voltage to be developed across the resistor 25. The secondary winding 28 is connected to the resistor 25 in a manner such that the voltage developed across the resistor 25 is in opposition to the output voltage of the bridge network 13 and therefore the velocity signal generator 30 acts to reduce the input signal to the electron discharge device 21 to thereby give a damping or anti-hunt action. This energization of the servomotor 34 also causes the control surface 37 to be positioned in a manner to return the aircraft to the desired direction of travel.

Energization of the relay 44 also causes the switch blade 83 to move into contact with the contact 85. As has been explained in detail before, the timing capacitor 98 is now charged through a circuit which includes the throttling potentiometer 86 and after a predetermined length of time the sensitivity of the control stage has decreased to a point where the control stage is no longer effective to pass a signal to the phase sensitive discriminator 64. The relay 44 is then deenergized and the switch blade 83 moves to make contact with the contact 84 while breaking its connection to contact 85. The connection from the switch blade 83 to the contact 84 connects the timing capacitor 98 in a discharge circuit of a relatively short time constant which includes the resistor 88. Also, the switch blade 46 breaks its connection to the contact 41 and the servomotor 34 is deenergized. After a relatively short time period the sensitivity of the control stage 54 is increased to a point where a signal is again passed to the phase sensitive discriminator 64 and the relay 44 is reenergized. The above mentioned cycle is now repeated and this operation continues until the aircraft has been returned to the desired position and the slider 11 cooperating with the potentiometer 12 is returned to its normal position by the directional gyroscope 10.

The important feature of this invention is that the relation of the deenergized time of the selectively energized relay to the energized time of this relay is such that the servomotor 34 does not appreciably decrease in speed during the small time duration in which the selectively energized relay is deenergized. It is this feature of intermittent energization of the servomotor 34 at a high frequency with a relatively short time period of deenergization which greatly improves a system such as this using a stabilizing device such as the velocity signal generator 30 in conjunction with a motor control apparatus which also incorporates the desirable feature of intermittently energizing the servomotor 34 to provide available speed control of the motor in accordance with the magnitude of the input signal.

It can therefore be seen that I have provided an improved motor control apparatus wherein an amplifier means is operative to control a motor through an intermittently energized relay means and a velocity signal generator, and that my apparatus provides proportional speed control of the motor whereby the speed of the motor is variable and a function of the error signal, the speed of the motor being substantially free of pulsations. While I have shown and described a preferred embodiment of my invention, other modifications will occur to those skilled in the art, and therefore I wish my invention to be limited only by the appended claims.

I claim as my invention:

1. Control apparatus comprising, means producing an electrical control signal of variable magnitude and phase, phase sensitive amplifier means having an input circuit and connected to selectively cause intermittent energization of a first or a second relay, means connecting said electrical control signal producing means to the input circuit of said amplifier means, a reversible motor connected to rotate in one direction or the other in response to the energization of said first or second relay and at a speed dependent upon the time periods of energization of said first or second relay, circuit means in said amplifier to control the sensitivity thereof in response to energization of said first or said second relay to effect intermittent energization of said first or second relay for variable time periods in accordance with the magnitude of the electrical signal applied to said input circuit, means including out contacts on said relays for controlling the period of deenergization of said first or second relay during intermittent energization thereof, said period being of a time duration less than the time necessary for the speed of said motor to reduce appreciably, a follow up means controlled by said motor for reducing the magnitude of the signal produced by said electrical control signal producing means, and means producing a signal depending in magnitude upon the speed of said motor, said last named means being connected to the input circuit of said amplifier means.

2. Control apparatus comprising, means for producing an electrical control signal variable in magnitude, a relay, an electrical motor means controlled by said relay, amplifier means normally responsive to said control signal for energizing said relay, means including a circuit controlled by said relay for rendering said amplifier means increasingly less responsive to said control signal when said relay is energized so as to cause periodic deenergization of said relay after periods of energization dependent in magnitude upon the magnitude of said control signal, said amplifier and said circuit having constants such that the relay is intermittently operated at a sufficiently high frequency that the speed of the motor is substantially free of pulsation and is of a value dependent upon the magnitude of said control signal, and means for increasing the tendency of the motor to operate at a speed dependent upon the magnitude of the signal, said last-named means including means for producing an electrical signal dependent upon the speed of said motor and means for applying said electrical signal to said amplifier means to reduce the effect of said control signal upon said amplifier means as the speed of the motor approaches a value corresponding to the magnitude of said control signal.

3. Control apparatus comprising, means for producing an electrical control signal, a relay, amplifier means having an input circuit, means connecting said electrical control signal producing means to said input circuit so that said amplifier means is normally responsive to said control signal to intermittently energize said relay in accordance therewith, a motor controlled by said relay, the speed of said motor depending upon the period of energization of said relay, follow up means controlled by said motor for reducing the electrical control signal produced by said first named means, means for producing an electrical signal depending upon the speed of said motor, circuit means connecting said last named means to the input circuit of said amplifier means such that said amplifier means is responsive to the combined signal produced by said last named means and said first named means, means including a relatively long time delay circuit controlled by said relay for rendering said amplifier means less responsive to said combined signal when said relay is energized, and means including out contacts on said relay for controlling the period of deenergization of said relay during intermittent energization thereof, thereby causing intermittent periods of energization of said relay at a frequency sufficiently high that the speed of said motor is free of substantial pulsation.

4. Control apparatus comprising, an electrical control signal producing means responsive to a variable condition, amplifier means having an input circuit and adapted to intermittently energize a first or a second relay, said electrical control signal producing means being connected to the input circuit of said amplifier means to furnish an input signal to said amplifier means and to thereby cause intermittent energization of said first or said second relay as said variable condition changes in one sense or the other from a desired condition, a motor adapted to be controlled for reversible rotation by said first and second relays, the speed of said motor depending upon the time periods of energization of said first or second relay, said relays controlling a feedback circuit to reduce the sensitivity of said amplifier to said input signal when said relays are energized such that said relays are intermittently energized for variable time periods depending upon the magnitude of said input signal and at a frequency sufficiently high to prevent substantial pulsation in the speed of said motor, said motor controlling a means adapted to restore the variable condition to its desired condition and controlling a follow up means to reduce the control signal produced by said electrical signal producing means, a second electrical signal producing means for producing a signal depending upon the speed of said motor, and circuit means connecting said second electrical signal producing means to the input circuit of said amplifier means to apply a signal in opposition to said control signal to thereby cause the speed of said motor to stabilize at a value indicative of the magnitude of said control signal.

5. Control apparatus adapted to control a positionable member comprising, a motor to position the member, means responsive to a need for movement of the member to produce an electrical control signal, amplifier means in circuit with said responsive means, said amplifier means controlling relay means to intermittently complete an energizing circuit to said motor for variable time periods depending upon the magnitude of said control signal, the speed of said motor thereby being dependent upon the magnitude of said control signal, means for producing an electrical signal depending in magnitude upon the speed of said motor, circuit means connecting said last named means to said amplifier means so that said electrical signal produced by said last named means opposes said electrical control signal to cause the speed of said motor to be stabilized at a value indicative of the magnitude of said control signal, and circuit means completed by said relay means to alter the sensitivity of said amplifier means to cause intermittent operation of said relay means at a rate which is sufficiently rapid to prevent substantial pulsation in the speed of said motor.

6. Control apparatus comprising, an adjustable condition changing device, driving means for said device, a pair of relays for selectively controlling the operation of said driving means for adjusting said device in opposite senses, a source of alternating electrical energy, a normally balanced electrical network connected to said source and including a pair of output terminals having a potential difference of magnitude and phase dependent upon the magnitude and direction of unbalance of said network, means responsive to a condition indicative of the need for adjustment of said device for unbalancing said network; electronic amplifier means having an input circuit and being adapted to selectively energize one of said relays in accordance with the phase of the potential applied to said input circuit, means associated with said amplifier means for causing intermittent energization of the selected relay, the time duration of energization of said relay being dependent upon the magnitude of the potential applied to said input circuit, means including out contacts on said relays for controlling the period of deenergization of said relay during conditions of intermittent energization thereof the frequency of said intermittent energization being sufficiently high to prevent substantial pulsation in the speed of said driving means, means driven by said driving means for producing an alternating electrical potential of a phase dependent upon the sense in which said device is adjusted by said driving means, the magnitude of said last named potential being dependent upon the speed of said driving means, and circuit means connecting said last named potential and said potential difference in a series circuit with the input circuit of said amplifier means such that said last named potential opposes said potential difference to thereby reduce the effect of said potential difference upon said amplifier means as the speed of said driving means approaches a value coresponding to the magnitude of said potential difference.

7. Control apparatus comprising, an adjustable condition changing means, a motor for adjusting said condition changing means, a condition sensing means for producing an electrical control voltage of a variable magnitude dependent upon a need for adjustment of said condition changing means, means driven by said motor for producing a voltage depending upon the speed of said motor; amplifier means responsive to voltages above a predetermined minimum voltage, said amplifier means having an input circuit and having a relay to intermittently complete an energizing circuit for said motor, the speed of said motor being dependent upon the time period of energization of said relay; a capacitor connected within said amplifier, said capacitor normally connected in a discharge circuit and adapted to be disconnected from said discharge circuit and connected in a charging circuit when said relay is energized, thereby increasing the minimum value of voltage to which said amplifier is responsive to cause said relay to be deenergized following a period of relay energization to thereby cause intermittent energization of said relay, the time period of energization of said relay depending upon the magnitude of said control voltage; means including the out contacts on said relay for controlling the period of deenergization of said relay during intermittent energization thereof, and the charge and discharge rates of said capacitor being such that the frequency of intermittent operation of said relay is sufficiently high to prevent pulsation in the speed of said motor; and circuit means connecting the control voltage produced by said condition sensing means and the voltage dependent upon the speed of said motor to the input circuit of said amplifier such that the last named voltage opposes said control voltage to reduce the effect of said control voltage upon said amplifier means as the speed of said motor approaches a value indicative of the magnitude of said control voltage.

8. Control apparatus comprising in combination: means producing an electrical control signal of variable phase and magnitude, phase responsive amplifier means having an input circuit and connected to selectively and intermittently energize a first or a second relay in response to a predetermined minimum magnitude input signal, a motor connected to be energized in response to either of said relays being energized, said motor rotating in a first or a second sense depending upon energization of said first or said second relay, the speed of said motor depending upon the time period of energization of said first or second relay; feedback means controlled by said relays to reduce the sensitivity of said amplifier means when said first or said second relay is energized to thereby increase the minimum magnitude input signal to which said amplifier means will respond, means including out contacts on said relay for controlling the period of deenergization of said relay during intermittent operation thereof, said amplifier means thereby causing intermittent energization of said motor at a frequency sufficiently high to prevent pulsations in the speed of rotation of said motor; means driven by said motor producing a signal depending in magnitude and phase upon the speed and sense of rotation of said motor, and circuit means connecting said first named means and said means driven by said motor to the input circuit of said amplifier means such that said signal indicative of the speed of said motor opposes said control signal to reduce the effect of said control signal upon said amplifier means as the speed of said motor approaches a value corresponding to the magnitude of the control signal.

9. Control apparatus comprising in combination: means producing an electrical control signal of variable magnitude, amplifier means having an input circuit and connected to intermittently energize a relay in response to a predetermined minimum magnitude input signal, a motor connected in an energizing circuit in response to said relay being energized, the speed of said motor depending upon the time period of energization of said relay; feedback means controlled by said relay to reduce the sensitivity of said amplifier means when said relay is energized, to thereby increase the minimum input signal to which said amplifier means will respond and to cause said relay to be deenergized following a period of relay energization; said feedback means comprising a capacitor associated with the input circuit of said amplifier means and connected to a charging circuit when said relay is energized and connected to a discharging circuit which includes out contacts on said relay for controlling the period of deenergization of said relay during intermittent energization thereof, said discharging circuit having a relatively short time constant with respect to the time constant of the charging circuit; said relay thereby being intermittently energized, the time period of energization increasing with the magnitude of the input signal and the time period of deenergization being substantially constant and of a relatively short time period; said amplifier means thereby varying the speed of rotation of said motor in accordance with the magnitude of input signal, the time period of deenergization of said relay being sufficiently short to prevent pulsation in the speed of said motor; means driven by said motor and producing a signal dependent in magnitude upon the speed of rotation of said motor; and circuit means connecting said first named means and said means driven by said motor to the input circuit of said amplifier means such that said signal indicative of the speed of said motor opposes said control signal to reduce the effect of said control signal upon said amplifier means as the speed of said motor approaches a value indicative of the magnitude of said control voltage.

10. Control apparatus comprising, an adjustable condition changing device, a motor for adjusting said device, amplifier means normally sensitive to a minimum input voltage having an input circuit and connected to intermittently energize a relay for varying time periods in accordance with the magnitude of voltage applied to said input circuit, said relay controlling an energizing circuit for said motor, the speed of said motor depending upon the time period of energization of said relay, means driven by said motor producing a voltage dependent upon the speed of rotation of said motor, condition sensing means producing a control voltage indicative of the need for adjustment of said device; circuit means connecting said condition sensing means and said means driven by said motor to the input circuit of said amplifier so that said voltage dependent upon the speed of said motor opposes said control voltage to reduce the effect of said control voltage upon said amplifier means as the speed of said motor approaches a value indicative of the magnitude of said control voltage, and feedback means controlled by said relay to cause intermittent energization of said relay, circuit means including out contacts on said relay for controlling the period of deenergization of said relay during intermittent energization thereof, said energization being at a frequency sufficiently high that the speed of rotation of said motor is free of substantial pulsation, said feedback means comprising a chargeable element connected to vary the sensitivity of said amplifier means, said chargeable element being connected in a relatively long time constant charging circuit when said relay is energized and being connected in a relatively short time constant discharging circuit when said relay is deenergized, so that said feedback means is effective to decrease the sensitivity of said amplifier means at a relatively slow rate when said relay is energized and to increase the sensitivity of said amplifier means at a relatively fast rate when said relay is deenergized to produce relatively short periods of relay deenergization following relatively long periods of relay energization.

11. Control apparatus comprising in combination, an adjustable condition changing device, a motor for adjusting said device, amplifier means normally sensitive to a minimum input voltage having an input circuit and connected to intermittently energize a relay for varying time periods depending upon the magnitude of voltage applied to said input circuit, said relay controlling an energizing circuit for said motor, the speed of said motor depending upon the time period of energization of said relay, means driven by said motor producing a voltage dependent upon the speed of rotation of said motor, condition sensing means producing a control voltage of variable magnitude indicative of the need of adjustment of said device, said condition sensing means including a follow-up means controlled by said motor and effective to reduce the magnitude of said control voltage; circuit means connecting said condition sensing means and said means driven by said motor to the input circuit of said amplifier so that said voltage dependent upon the speed of said motor opposes said control voltage to reduce the effect of said control voltage upon said amplifier means as the speed of the motor approaches a value corresponding to the magnitude of said control voltage, and feedback means controlled by said relay to cause said intermittent energization of said relay, circuit means including out contacts on said relay for controlling the period of deenergization of said relay during intermittent energization thereof, the frequency of said intermittent energization being sufficiently high to prevent substantial pulsations in the speed of said motor, said feedback means comprising a chargeable element connected to vary the sensitivity of said amplifier means in response to the electrical charge of said element, said chargeable element being connected in a relatively long time constant charging circuit when said relay is energized and being connected in a relatively short time constant discharging circuit when said relay is deenergized.

12. Control apparatus comprising, an adjustable condition changing device, a variable speed motor for adjusting said device in a first or a second sense, phase sensitive amplifier means having an input circuit and being normally sensitive to a minimum input voltage, said amplifier means connected to selectively and intermittently energize a first or a second relay, said relays controlling energizing circuits for said motor to cause said motor to adjust said device in said first or said second sense at a speed dependent upon the voltage applied to said input circuit; means driven by said motor producing a voltage whose phase and magnitude depend upon the sense and speed of adjustment of said device, condition sensing means producing a control voltage whose phase depends upon the sense in which there is a need for adjustment of said device and whose magnitude depends upon the need for adjustment of said device, circuit means connecting said condition sensing means and said means driven by said motor to the input circuit of said amplifier means so that said voltages are in phase opposition thereby stabilizing the speed of said motor at a value indicative of the magnitude of said control voltage, and feedback means controlled by either of said relays to cause said intermittent energization of the selectively energized one of said relays, circuit means including out contacts on said relays for controlling the period of deenergization of said relays during intermittent energization thereof thereby causing energization at a frequency sufficiently high to prevent substantial pulsations in the speed of said device, said feedback means comprising a first capacitor and a second capacitor associated with said first and second relays respectively, said first and second capacitors being connected to vary the sensitivity of said amplifier in response to the electrical charge of said capacitor associated with said one selectively energized relay, said capacitor associated with said one selectively energized relay being connected in a relatively long time constant charging circuit when said relay is energized and being connected in a relatively short time constant discharge circuit when said relay is deenergized.

13. Control apparatus comprising, an adjustable condition changing means, a variable speed motor operative to adjust said condition changing means, means driven by said motor producing a voltage depending in magnitude upon the speed of said motor, condition sensing means producing a control voltage whose magnitude is indicative of the need for adjustment of said condition changing means; amplifier means having an input circuit and being normally sensitive to a predetermined minimum magnitude input voltage, a relay having an actuating coil intermittently energized by said amplifier means for time periods dependent upon the magnitude of voltage applied to said input circuit, said relay being operative to connect said motor in an energizing circuit; circuit means connecting said means driven by said motor and said condition sensing means to the input circuit of said amplifier means so that said voltage dependent upon the speed of said motor opposes said control voltage to reduce the effect of said control voltage upon said amplifier means as the speed of the motor approaches a value corresponding to the magnitude of said control voltage; a regenerative feedback circuit in said amplifier means increasing the sensitivity of said amplifier means in proportion to the level of energization of said actuating coil, and a degenerative feedback circuit in said amplifier means adapted to be completed by said relay to decrease the sensitivity of said amplifier means to thereby cause intermittent energization of said relay at a frequency sufficiently high to prevent substantial pulstations in the speed of said motor.

14. In a control apparatus, an adjustable condition changing means, condition sensing means producing a control voltage whose magnitude is indicative of the need for adjustment of said condition changing means, a variable speed motor operative to adjust said condition changing means at a speed dependent upon the magnitude of said control voltage, means driven by said motor producing a voltage depending in magnitude upon the speed of said motor; a relay having a switch blade and an actuating winding, said actuating winding being operative to move said switch blade to an operating position when current of a first value is applied thereto and maintaining said switch blade at said operating position until said current reduces to a second value, said switch blade when in said operating position completing an energizing circuit for said motor; electronic amplifier means having an input circuit and being sensitive to a predetermined minimum input voltage to intermittently supply a current of said first value to said actuating winding, circuit means connecting said means driven by said motor and said condition sensing means to the input circuit of said amplifier means so that said voltage dependent upon the speed of said motor opposes said control voltage to thereby reduce the effect of said control voltage on said amplifier means as the speed of the motor approaches a value corresponding to the magnitude of said control signal; a regenerative feedback circuit increasing the sensitivity of said amplifier means in proportion to the level of energization of said actuating coil and thereby increasing the value of said current applied to said actuating coil to insure an abrupt movement of said switch blade to said operating position, said regenerative feedback circuit comprising an impedance element in circuit with said actuating coil and said input circuit; and a degenerative feedback circuit controlled by said relay to decrease the sensitivity of said amplifier means when said switch blade is in said operative position to thereby decrease the value of said current applied to said actuating coil, said degenerative feedback circuit comprising a time delay network in circuit with said input circuit and operative over a relatively long time period wherein said amplifier means causes said current to decrease from said first to said second value and providing a relatively short time period with said switch blade in inoperative position wherein said amplifier means causes said current to increase from said second to said first value, said amplifier means thus causing intermittent energization of said relay at a frequency sufficiently high to prevent substantial pulsations in the speed of said motor.

References Cited in the file of this patent

UNITED STATES PATENTS

| | | |
|---|---|---|
| 2,425,733 | Gille et al. | Aug. 19, 1947 |
| 2,454,107 | Wald | Nov. 16, 1948 |
| 2,456,420 | Jackson | Dec. 14, 1948 |
| 2,508,082 | Wald | May 16, 1950 |
| 2,510,296 | Root | June 6, 1950 |
| 2,519,667 | Koenig, Jr. | Aug. 22, 1950 |
| 2,593,950 | Williams, Jr. | Apr. 22, 1952 |